(12) United States Patent
Sumner et al.

(10) Patent No.: US 9,947,124 B2
(45) Date of Patent: Apr. 17, 2018

(54) MOTION CONTROL OF ACTIVE DEFORMABLE OBJECTS

(71) Applicant: Pixar, Emeryville, CA (US)

(72) Inventors: Robert Sumner, Zurich (CH); Stelian Coros, Zurich (CH); Sebastian Martin, Zurich (CH); Bernhard Thomaszewski, Zurich (CH)

(73) Assignee: Disney Enterprises, Inc., Burbank, CA (US)

( * ) Notice: Subject to any disclaimer, the term of this patent is extended or adjusted under 35 U.S.C. 154(b) by 741 days.

(21) Appl. No.: 13/953,516

(22) Filed: Jul. 29, 2013

(65) Prior Publication Data

US 2015/0029198 A1   Jan. 29, 2015

(51) Int. Cl.
 *G06T 13/20* (2011.01)
 *G06T 19/20* (2011.01)
 *G06T 13/40* (2011.01)
 *G06T 17/00* (2006.01)

(52) U.S. Cl.
 CPC .............. *G06T 13/20* (2013.01); *G06T 19/20* (2013.01); *G06T 13/40* (2013.01); *G06T 17/00* (2013.01); *G06T 2219/2016* (2013.01); *G06T 2219/2021* (2013.01)

(58) Field of Classification Search
 None
 See application file for complete search history.

(56) References Cited

U.S. PATENT DOCUMENTS

2009/0204909 A1* 8/2009 Hornbaker .................... 715/757
2009/0306948 A1* 12/2009 Irving ..................... G06T 13/20
                                                              703/6

OTHER PUBLICATIONS

Coros, Stelian, Philippe Beaudoin, and Michiel van de Panne. "Robust task-based control policies for physics-based characters." ACM Transactions on Graphics (TOG). vol. 28. No. 5. ACM, 2009.*
de Lasa, Martin, Igor Mordatch, and Aaron Hertzmann. "Feature-based locomotion controllers." ACM Transactions on Graphics (TOG). vol. 29. No. 4. ACM, 2010.*
Ijiri, Takashi, et al. "ProcDef: Local-to-global Deformation for Skeleton-free Character Animation." Computer Graphics Forum. vol. 28. No. 7. Blackwell Publishing Ltd, 2009.*
Jacobson, Alec, et al. "Bounded biharmonic weights for real-time deformation."ACM Trans. Graph. 30.4 (2011): 78.*
Martin, Sebastian, et al. "Example-based elastic materials." ACM Transactions on Graphics (TOG) 30.4 (2011): 72.*
Sorkine, Olga, and Marc Alexa. "As-rigid-as-possible surface modeling."Symposium on Geometry processing. vol. 4. 2007.*

(Continued)

*Primary Examiner* — Gregory J Tryder
*Assistant Examiner* — Diane Wills
(74) *Attorney, Agent, or Firm* — Patterson + Sheridan, LLP

(57) ABSTRACT

Techniques are proposed for animating a deformable object. A geometric mesh comprising a plurality of vertices is retrieved, where the geometric mesh is related to a first rest state configuration corresponding to the deformable object. A motion goal associated with the deformable object is then retrieved. The motion goal is translated into a function of one or more state variables associated with the deformable object. A second rest state configuration corresponding to the deformable object is computed by adjusting the position of at least one vertex in the plurality of vertices based at least in part on the function.

20 Claims, 7 Drawing Sheets

(56) References Cited

OTHER PUBLICATIONS

Zhang et al., "Robust mesh editing using Laplacian coordinates", Department of Computer Science, Rutgers University, Nov. 2010.*

Barbic, J., and Popovic, J. 2008. Real-time control of physically based simulations using gentle forces. ACM Trans. on Graphics (SIGGRAPH Asia 2008) 27, 5.

Barbic, J., Da Silva, M., and Popovic, J. 2009. Deformable object animation using reduced optimal control. ACM Trans. on Graphics (SIGGRAPH 2009) 28, 3.

Bergou, M., Mathur, S., Wardetzky, M., and Grinspun, E. 2007. Tracks: Toward Directable Thin Shells. ACM Transactions on Graphics (SIGGRAPH) 26, 3, 50:1-50:10.

Botsch, M., Pauly, M., Gross, M., and Kobbelt, L. 2006. PriMo: Coupled prisms for intuitive surface modeling. In Proc. of Symp. on Geometry Processing, 11-20.

Cirak, F., Ortiz, M., and Schrder, P. 2000. Subdivision surfaces: A new paradigm for thin-shell finite-element analysis. International Journal for Numerical Methods in Engineering 47, 2039-2072.

Coros, S., Beaudoin, P., and Van De Panne, M. 2010. Generalized biped walking control. ACM Transctions on Graphics 29, 4, Article 130. [Abstract Only].

Raibert, M. H., and Hodgins, J. K. 1991. Animation of dynamic legged locomotion. In Proc. ACM SIGGRAPH, 349-358.

Sueda, S., Kaufman, A., and Pai, D. K. 2008. Musculotendon simulation for hand animation. ACM Trans. Graph. (Proc. SIGGRAPH) 27, 3.

Tan, J., Gu, Y., Turk, G., and Liu, C. K. 2011. Articulated swimming creatures. 58:1-58:12.

Teran, J., Sifakis, E., Blemker, S. S., Ng-Thow-Hing, V., Lau, C., and Fedkiw, R. 2005. Creating and simulating skeletal muscle from the visible human data set. IEEE Transactions on Visualization and Computer Graphics 11, 317-328.

Terzopoulos, D., Platt, J., Barr, A., and Fleischer, K. 1987. Elastically deformable models. In Proc. of ACM SIGGRAPH, 205-214.

Tu, X., and Terzopoulos, D. 1994. Artificial fishes: physics, locomotion, perception, behavior. 43-50.

Twigg, C. D., and James, D. L. 2007. Many-worlds browsing for control of multibody dynamics. In ACM SIGGRAPH 2007 papers, ACM, New York, NY, USA, SIGGRAPH '07.

Twigg, C. D., and Kacic-Alesi'C, Z. 2011. Optimization for sag-free simulations. In Proceedings of the 2011 ACM SIGGRAPH/ Eurographics Symposium on Computer Animation, ACM, New York, NY, USA, SCA '11, 225-236.

Wicke, M., Ritchie, D., Klingner, B. M., Burke, S., Shewchuk, J. R., and O'Brien, J. F. 2010. Dynamic local remeshing for elastoplastic simulation. In Proc. of ACM SIGGRAPH '10, 49:1-49:11.

Winkler, T., Drieseberg, J., Alexa, M., and Hormann, K. 2010. Multi-scale geometry interpolation. In Proc. of Eurographics '10, 225-236.

Wojtan, C., Mucha, P. J., and Turk, G. 2006. Keyframe control of complex particle systems using the adjoint method. In SCA '06: Proceedings of the 2006 ACM SIGGRAPH/ Eurographics symposium on Computer animation, Eurographics Association. [Abstract Only].

Nu, J.-C., and Popovic, Z. 2003. Realistic modeling of bird flight animations. 888-895.

Wu, J., and Popovic, Z. 2010. Terrain-adaptive bipedal locomotion control. ACM Transactions on Graphics (TOG) 29, 4, Article 72. [Abstract Only].

Yin, K., Loken, K., and Van De Panne, M. 2007. SIMBICON: Simple biped locomotion control. ACM Trans. on Graphics (Proc. SIGGRAPH) 26, 3, Article 105.

Zajac, E. F. 1989. Muscle and tendon: properties, models, scaling, and application to biomechanics and motor control. CRC Critical Reviews in Biomedical Engineering 17, 359-411. [Abstract Only].

Coros, S., Karpathy, A., Jones, B., Reveret, L., and Van De Panne, M. 2011. Locomotion skills for simulated quadrupeds. ACM Transctions on Graphics 30, 4.

De Lasa, M., Mordatch, I., and Hertzmann, A. 2010. Feature-based locomotion controllers. ACM Transactions on Graphics (TOG) 29, 4, Article 131.

Frohlich, S., and Botsch, M. 2011. Example-driven deformations based on discrete shells. Comput. Graph. Forum 30, 8, 2246-2257.

Girard, M., and Maciejewski, A. 1985. Computational modeling for the computer animation of legged figures. ACM SIGGRAPH Computer Graphics 19, 3, 263-270 [Abstract Only].

Grinspun, E., Hirani, A. N., Desbrun, M., and Schr'O Der, P. 2003. Discrete shells. In Proc. of Symp. on Computer Animation (SCA '03).

Hodgins, J., Wooten, W., Brogan, D., and O'Brien, J. 1995. Animating human athletics. In Proc. ACM SIGGRAPH, 71-78.

Ijiri, T., Takayama, K., Yokota, H., and Igarashi, T. 2009. Procdef: Local-to-global deformation for skeleton-free character animation. Computer Graphics Forum (proceedings of Pacific Graphics) 28, 7, 1821-1828 [Abstract Only].

Irving, G., Schroeder, C., and Fedkiw, R. 2007. Volume conserving finite element simulations of deformable models. ACM Trans. Graph. 26.

Jeon, H., and Choi, M.-H. 2007. Interactive motion control of deformable objects using localized optimal control. In Robotics and Automation, 2007 IEEE International Conference on, 2582 -2587.

Joshi, P., Meyer, M., Derose, T., Green, B., and Sanocki, T. 2007. Harmonic coordinates for character articulation. In Proc. of ACM SIGGRAPH '07.

Kaufmann, P., Martin, S., Botsch, M., Grinspun, E., and Gross, M. 2009. Enrichment textures for detailed cutting of shells. In Proc. of ACM SIGGRAPH '09, 50:1-50:10.

Lee, Y., Kim, S., and Lee, J. 2010. Data-driven biped control. ACM Transactions on Graphics (TOG) 29, 4, Article 129.

Martin, S., Thomaszewski, B., Grinspun, E., and Gross, M. 2011. Example-based elastic materials. In Proc. of ACM SIGGRAPH '11, 72:1-72:8.

McNamara, A., Treuille, A., Popovi'C, Z., and Stam, J. 2004. Fluid control using the adjoint method. ACM Transactions on Graphics 23, 3 (Aug.).

Nocedal, J., and Wright, S. J. 2000. Numerical Optimization. Springer.

O'Brien, J., 2011. Thoughts on physically based animation. Keynote talk, Symposium on Computer Animation (SCA).

Pai, D. K. 2002. Strands: Interactive simulation of thin solids using cosserat models. Computer Graphics Forum.

Popovic, J., Seitz, S. M., Erdmann, M., Popovi'C, Z., and Witkin, A. 2000. Interactive manipulation of rigid body simulations. In Proceedings of the 27th annual conference on Computer graphics and interactive techniques, ACM Press/Addison-Wesley Publishing Co., New York, NY, USA, SIGGRAPH '00, 209-217.

\* cited by examiner

MOTION CONTROL OF ACTIVE DEFORMABLE OBJECTS

BACKGROUND OF THE INVENTION

Field of the Invention

The present invention relates to the field of computer-based animation, in particular, to motion control of active deformable objects.

Description of the Related Art

Computer generated animation typically involves simulating the locomotion of various objects, such as characters and other virtual actors, in a virtual space. Many objects are articulated, in that such objects include a rigid internal structure that includes the equivalence of bones and joints. Accordingly, this rigid internal structure forms a virtual "skeleton" for the articulated objects. Such objects, such as humanoids and animals, may be animated via physics-based locomotion controllers that translate high-level commands, such as "walk left," "crouch," or "jump," into sequences of joint torques that yield the desired behavior. Deformable objects, on the other hand, are generally passive, in that the objects have no such internal rigid structure to which joint torques may be applied. Examples of deformable objects include jelly-like creatures, walking carpets, singing candelabra, or water-pail-carrying broomsticks.

Such a passive deformable object may be animated using physics-based simulation by applying external control forces to the deformable object in order to achieve desired motion objectives. These external forces do not typically sum to zero and may have non-vanishing rotational components. As a result, these external forces may change linear and angular momenta related to the deformable object in arbitrary, non-physical ways, which may lead to unrealistic motion. For example, animating a deformable object by applying external forces may yield motion similar to that of a marionette controlled by an invisible puppeteer.

Alternatively, a deformable object may be fitted with an internal rigid structure, essentially providing a "skeleton" for the deformable object. Joint torques may then be applied to that internal structure, as is done for articulated objects. As a result, the deformable object moves in response to forces applied to the joints of the internal structure. However, the resulting motion is restricted to what is achievable by articulating the internal structure. Such motion may be substantially less than the motion available to the original deformable object that is not fitted with the internal structure.

SUMMARY OF THE INVENTION

One embodiment of the present invention includes a method for animating a deformable object. The method includes retrieving a geometric mesh comprising a plurality of vertices related to a first rest state configuration corresponding to the deformable object. The method further includes retrieving a motion goal associated with the deformable object, and translating the motion goal into a function of one or more state variables associated with the deformable object. The method further includes computing a second rest state configuration corresponding to the deformable object by adjusting the position of a least one vertex in the plurality of vertices based at least in part on the function. The method further includes generating a regularizing potential comprising a smoothing function associated with the second rest state configuration. The method further includes applying the regularizing potential to the second rest state configuration to create a third rest state configuration corresponding to the deformable object.

Other embodiments include, without limitation, a computer-readable storage medium that includes instructions that enable a processing unit to implement one or more aspects of the disclosed methods as well as a computing system configured to implement one or more aspects of the disclosed methods.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
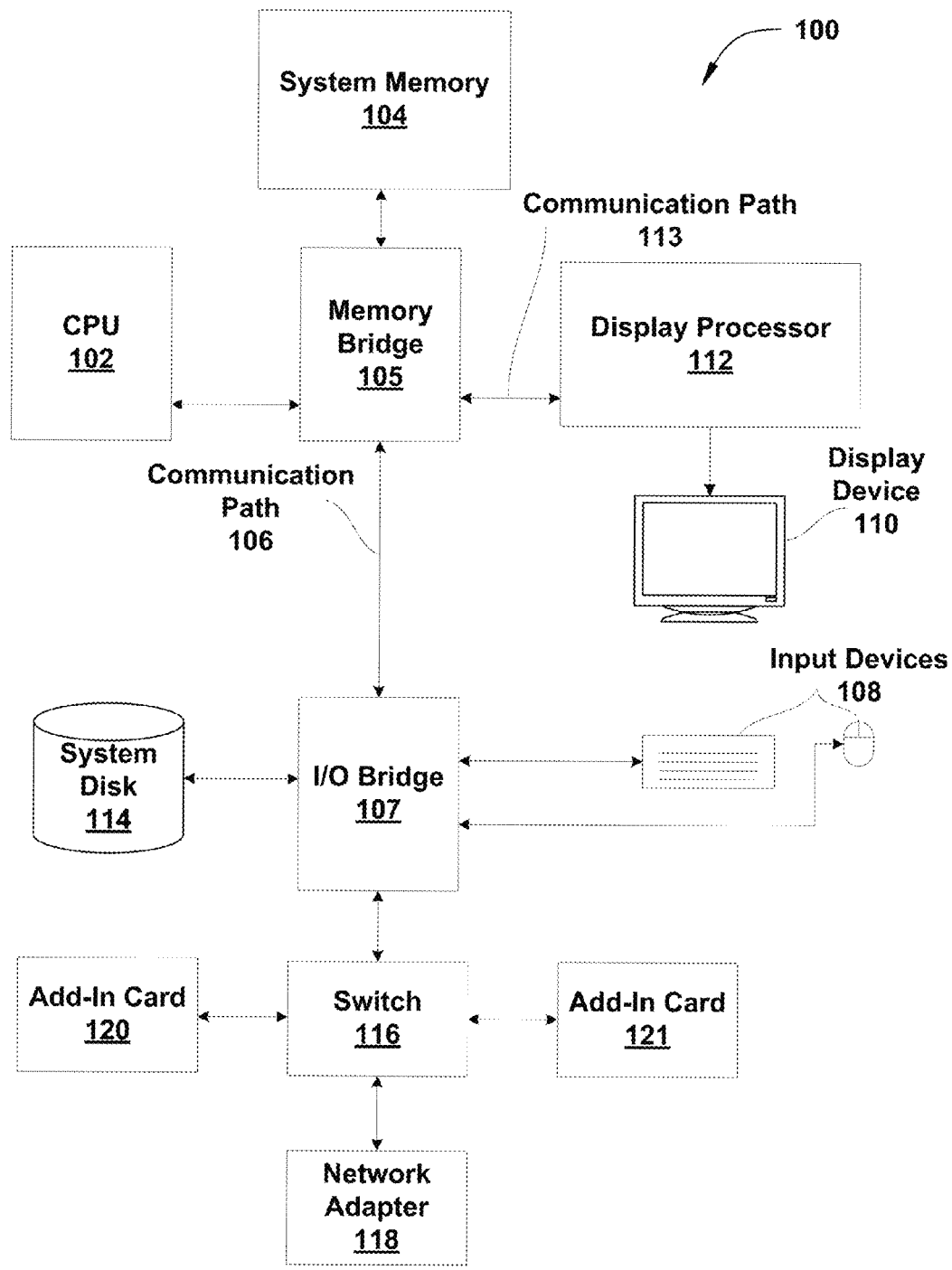
FIG. 1 depicts one architecture of a system 100 within which embodiments of the present invention may be implemented.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Hardware Overview

FIG. 1 depicts one architecture of a system 100 within which embodiments of the present invention may be implemented. This figure in no way limits or is intended to limit the scope of the present invention.

System 100 may be a personal computer, video game console, personal digital assistant, rendering engine, or any other device suitable for practicing one or more embodiments of the present invention.

As shown, system 100 includes a central processing unit (CPU) 102 and a system memory 104 communicating via a bus path that may include a memory bridge 105. CPU 102 includes one or more processing cores, and, in operation, CPU 102 is the master processor of system 100, controlling and coordinating operations of other system components. System memory 104 stores software applications and data for use by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices 108 (e.g., keyboard, mouse, joystick, digitizer tablets, touch pads, touch screens, still or video cameras, motion sensors, and/or microphones) and forwards the input to CPU 102 via memory bridge 105.

A display processor 112 is coupled to memory bridge 105 via a bus or other communication path (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104.

Display processor 112 periodically delivers pixels to a display device 110 (e.g., a screen or conventional CRT, plasma, OLED, SED or LCD based monitor or television). Additionally, display processor 112 may output pixels to film recorders adapted to reproduce computer generated images on photographic film. Display processor 112 can provide display device 110 with an analog or digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present invention, instructions and/or data representing a scene are provided to a render farm or a set of server computers, each similar to system 100, via network adapter 118 or system disk 114. The render farm generates one or more rendered images of the scene using the provided instructions and/or data. These rendered images may be stored on computer-readable media in a digital format and optionally returned to system 100 for display. Similarly, stereo image pairs processed by display processor 112 may be output to other systems for display, stored in system disk 114, or stored on computer-readable media in a digital format.

Alternatively, CPU 102 provides display processor 112 with data and/or instructions defining the desired output images, from which display processor 112 generates the pixel data of one or more output images, including characterizing and/or adjusting the offset between stereo image pairs, in the case of stereoscopic images. The data and/or instructions defining the desired output images can be stored in system memory 104 or graphics memory within display processor 112. For example, CPU 102 could execute a client media player application (not shown) that receives a media stream from a content provider, and transmits the media stream to the display processor 112 for viewing on the display device 110. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

CPU 102, render farm, and/or display processor 112 can employ any surface or volume rendering technique known in the art to create one or more rendered images from the provided data and instructions, including rasterization, scanline rendering REYES or micropolygon rendering, ray casting, ray tracing, image-based rendering techniques, and/or combinations of these and any other rendering or image processing techniques known in the art.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies display processor 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Motion Control of Active Deformable Objects

Techniques are described for controlling motion of deformable objects using a rest state adaptation approach, providing a mechanism for actuation and propulsion of these deformable objects to engage in various activities, such as walking, creeping, rolling or propelling in some manner. Changes to the rest state configurations of deformable objects are automatically computed in such a way that results in a directed space of potential solutions. A solver selects a specific solution from this directed space that minimizes a mathematical function associated with the motion objective of the deformable object.

The resulting motion is plausible and visually pleasing, in that the deformable objects are animated to appear as if the objects are living, autonomous characters moving via internal forces. The motion of the deformable objects results from automatically adjusting the rest state configuration of a potential field that is internal to the deformable objects. These automatically adjusted rest state configurations allow simulated curves, surfaces, and 3D solid objects to walk, crawl, and hop automatically. Moreover, the techniques described herein are directable by a user, leading to more artistic control of the motion path. The techniques are also efficient, leading to reduced animation times and correspondingly lower demands on computing resources.

Figure 2:
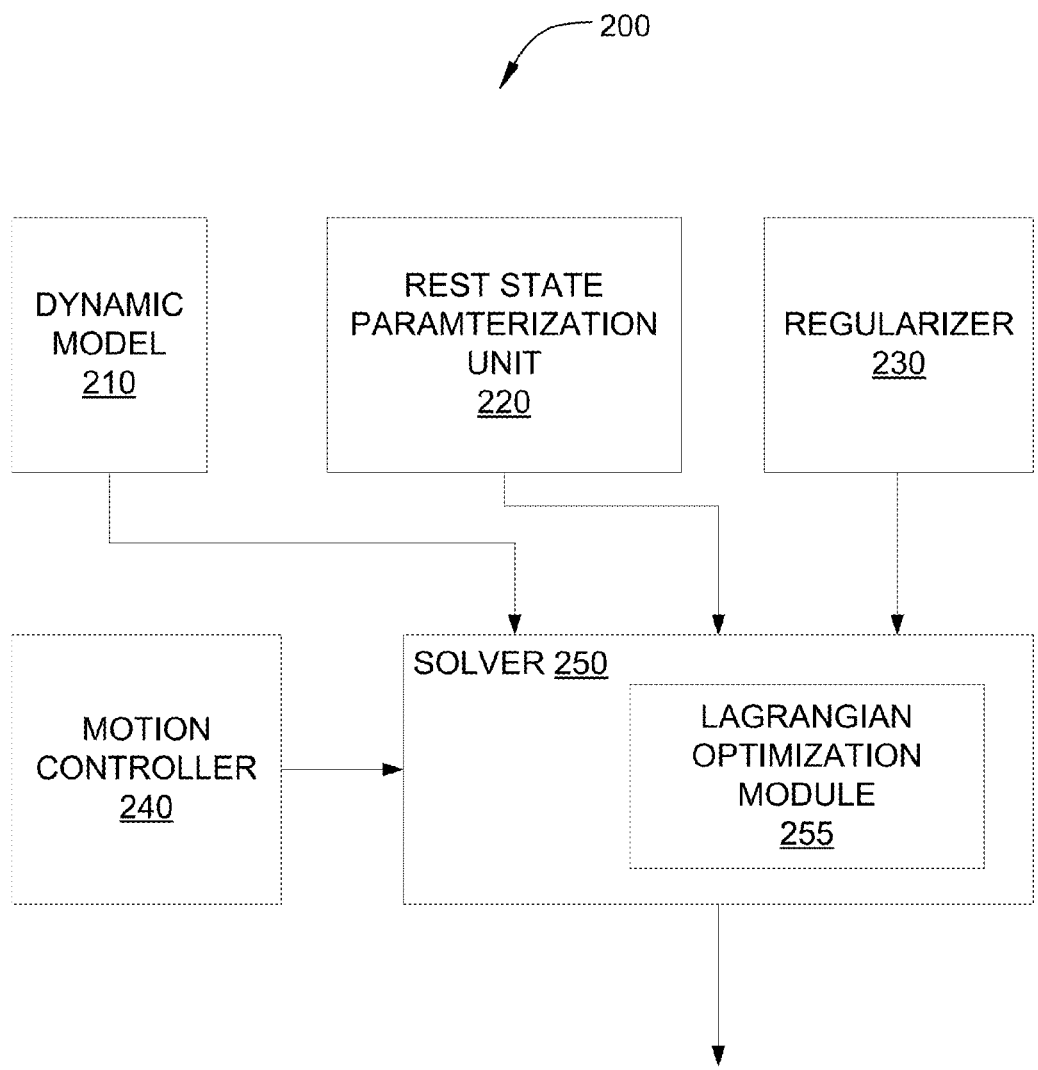
FIG. 2 illustrates a deformable object animation system, as may be implemented on the system of FIG. 1, according to one embodiment of the present invention.

FIG. 2 illustrates a deformable object animation system 200, as may be implemented on the system 100 of FIG. 1, according to one embodiment of the present invention. As shown, the deformable object animation system 200 includes a dynamic model 210, a rest state parameterization module 220, a regularizer 230, a motion controller 240, and a solver 250.

The dynamic model 210 defines the deformation behavior of a deformable object as governed by an elastic potential associated with the object. Motion of active deformable objects is controlled via deformations internal to the object. Such control is achieved by dynamically adapting the rest shape of the objects in order to induce deformations that, together with environment interactions, result in purposeful and physically-plausible motions. The rest state of deformable objects is adapted by altering the position of one or more vertices on a geometric mesh associated with the object. This geometric mesh may be created by subdividing the deformable object into a plurality of smaller geometric shapes of appropriate dimension. In one example, a deformable object in the shape of a curve could be subdivided into a series of end-connected line segments. In another example, a deformable object in the shape of a surface, such as a sheet or shell, could be subdivided into a series of connected polygonal shapes, such as triangles. In yet another example, a deformable object in the shape of a 3D object could be subdivided into a series of connected geometric solids, such as tetrahedra. In yet another example, the polygonal mesh creates a "cage" that envelops the deformable object.

As a starting point, X and x denotes the vertex positions of the geometric mesh associated with a deformable object in the undeformed and deformed rest state configurations, respectively. The deformation behavior of the object is governed by an elastic potential W(X,x) that is generated by the dynamic model 210. The elastic potential gives rise to forces internal to the object $$f_{int} = -\frac{\partial W}{\partial x},$$

which, together with external forces $f_{ext}$, such as gravity, contacts, and friction, form the dynamic behavior of the object according a motion equation as given by Equation 1 below:

$$M\ddot{x} - f_{int}(X,x) - f_{ext} = 0 \qquad \text{Equation 1}$$

where M is the mass matrix and $\ddot{x}$ represents nodal accelerations associated with the mesh vertices. The dynamic mode 210 does not add external forces that are not the result of correct physical interactions with the environment, such as gravity, contacts with other objects, and friction. Rather, motion of the deformable object results directly from internal deformations. As such, the vertex positions of the undeformed mesh X are the sole parameters for controlling the motion of the object. In other words, the rest shape of the object is adapted to yield the required deformations for motion control. This approach is similar to the way muscles work and, as such, result in control forces that conserve momentum.

The dynamic model 210 computes undeformed and deformed rest state configurations that minimize the distance to motion objectives of the deformable object while satisfying Equation 1. If g(x,t) denotes vector-valued objective function whose components measure the deviation from a given set of time-dependent motion goals, then the dynamic model 210 may compute a constrained optimization problem defined by Equation 2 below:

$$\min_{x,X} \frac{1}{2}|g(x,t)|^2 \text{ s.t. } c(X,x,\ddot{x}) = 0 \qquad \text{Equation 2}$$

where c encodes Equation 1 as a hard constraint. Optimal control parameters X are determined that best achieve the motion objectives g while satisfying physical constraints c.

The optimization problem defined by Equation 2 may be combined with any technically feasible time integration approach. For example, Equation 1 could be discretized in time using an implicit Euler method as given by Equation 3 below:

$$M\left(\frac{x_{n+1}}{h^2} - \frac{x_n}{h^2} - \frac{v_n}{h}\right) - f_{int}(X,x_{n+1}) - f_{ext} = 0 \qquad \text{Equation 3}$$

for a given time step n. In the form of Equation 3, the hard constraints may be interpreted as an implicit map $X \rightarrow x_{n+1}$ that parameterizes the space of possible solutions. From this solution space, the solver 250 chooses a solution that minimizes the motion objective function.

In some embodiments, the elastic potential of the deformable object may be modified to obtain more efficient higher-order derivatives, thereby reducing the computational complexity of resolving the motion of the deformable object. The energy expressions associated with the elastic potential depend on whether the deformable object is a curve, a surface, or a 3D solid.

The energy of a given deformable object is determined by first computing the energy density of the object given the vertex positions of the undeformed rest state configuration X and the deformed rest state configuration x. The energy density is then integrated over the initial geometry $\overline{X}$ of the deformable object. While X and x change during the animation process, $\overline{X}$ is deemed to remain constant.

For curves, the elastic potential is defined according to Equation 4 below:

$$W_{curve} = \sum_i \frac{1}{2}k_l(l_i^2 - L_i^2)^2 \frac{1}{\overline{L}_i^3} + \sum_a \frac{1}{2}k_b(\theta_a - \Theta_a)^2 \overline{T}_a \qquad \text{Equation 4}$$

where $l_i$ and $L_i$ are the deformed length and undeformed length of edge i, respectively, $\theta_i$ and $\Theta_i$ are the deformed angle and undeformed angle enclosed by two adjacent edges i and j, respectively, and $$\overline{T}_a = \frac{1}{2}(\overline{L}_i + \overline{L}_j).$$

The term $\overline{L}_i^3$ accounts for proper scaling of the energy density for a given mesh resolution. In some embodiments, Equation 4 may be applied to thin shells by replacing θ and Θ with the dihedral angle between two edge-adjacent triangles.

For surfaces, the elastic potential is defined using finite elements and a modified St. Venant-Kirchhoff material according to Equation 5 below:

$$W_{surface} = \sum_e \frac{1}{2}k_l\|E_e\|^2 \overline{A}_e + \frac{1}{2}k_a(a_e - A_e)^2 \frac{1}{\overline{A}_e} \qquad \text{Equation 5}$$

where the Green strain $$E = \frac{1}{2}(F^T F - I),$$

and where a and A denotes the area of the deformed and undeformed mesh triangle, respectively. The deformation gradient F is computed as further described herein.

Equation 5 may be extended for 3D solids, although such a formulation may be computationally intensive. A simplified approach computes the distortion of a tetrahedron be measuring the change in edge lengths of the tetrahedron according to Equation 6 below:

$$W_{solid} = \sum_e \sum_{j=1}^{6} \frac{1}{12} k_l (l_{ej}^2 - L_{ej}^2)^2 \frac{V_e}{L_{ej}^4} + \frac{1}{2} k_v (v_e - V_e)^2 \frac{1}{V_e} \quad \text{Equation 6}$$

The rest state parameterization module 220 determines rest state configuration X(p) of the deformable object, where the rest state configuration includes the set of mesh vertices that may be controlled to animate the object. In one embodiment, every vertex of the mesh may be controlled as an independent control variable for the optimization problem of Equation 2. However, if a deformable object is associated with a complex mesh that includes a large number of vertices, then optimizing Equation 2 may involve resolving an unwieldy number of parameters. Accordingly, the rest state parameterization module 220 may reduce the number of directly-controllable mesh vertices. As a result, the rest state parameterization module 220 generates rest state configuration X(p) according to Equation 7 below:

$$X(p) = X_0 + Lp \quad \text{Equation 7}$$

where $X_0$ is the initial rest state of the deformable object, p describes generalized displacements of the reduced set of controllable mesh vertices, and L is a linear map between changes in rest state coordinates X and reduced control variables p. With the representation of Equation 7, the optimization problem of Equation 2 may be restated in terms of the state variables x and reduced control variables p as given by Equation 8 below:

$$\min_{x,p} \frac{1}{2} |g(x, t)|^2 + r(p) \quad \text{s.t.} \quad c(X(p), x) = 0 \quad \text{Equation 8}$$

As implied by Equation 8, the nodal accelerations $\ddot{x}$ of Equation 1 are an explicit function of the vertex positions of the geometric mesh associated with the deformed rest state configuration x. The term r(p) is a regularizing term generated by the regularizer 230, as further described herein. The linear map L determines the space of allowable rest shapes, and implicitly, the capabilities of the controllable deformable objects. Approaches for selecting flexible and efficient rest pose parameterizations linear maps include a cage-based approach and an example-based approached, further described herein.

In some embodiments, the rest state parameterization module 220 may adapt the rest shape configuration to account for contact and friction forces that affect the motion path when a deformable object comes into contact with other objects. Such contact and friction forces may be implemented via implicit springs activate when vertices of the geometric mesh come into contact with external objects. The point of contact $c_i$ for each colliding vertex i may be determined by projecting each colliding vertex i onto the mesh of the external object. A contact force may then be applied to the vertices of the mesh associated with the deformable object, where the contact force is proportional to deviations from the point of contact $c_i$ in the triangle's normal direction and a friction force that is proportional to in-plane deviations from $c_i$. The contact and friction forces may be added to the $f_{ext}$ term in Equation 3, which then becomes an explicit function of vertex positions at the next time step $x_{n+1}$. Adapting the rest shape configuration to account for contacts and friction may affect the motion of all vertices and, accordingly, the forces generated at the contact points with the external object.

The regularizer 230 generates a smoothing function to modify the rest state configuration generated by the rest state parameterization module 220. The rest state configuration that is optimized according to Equation 2 may, nevertheless, produce undesirable characteristic as the deformable object moves. For example, the rest state parameterization module 220 could produce rest state configurations with large isolated deformations. Such deformations could result in significant distortions of the deformable object as the object moves. The regularizer 230 dampens such large deformations, resulting in more smoothly deformed rest shapes. The smoothing function generated by the regularizer 230 may be expressed as a regularizing potential r(p) that is added to the motion objective as shown in Equation 8. The specific regularizing potential r(p) depends on which rest state parameterization (unrestricted, cage-based, or example-based) is selected, as further described herein.

The motion controller 240 translates high-level motion goals, such as walk left, hop, and crawl, into sequences of objectives expressed as algebraic functions of state variables associated with the deformable object via the objective function g(x,t). This vector-valued objective function is the result of concatenating an arbitrary number of constraints that are linear in the positions of the vertices. The objective function g(x,t) may be expressed as shown in Equations 9 and 10 below:

$$g(x, t) = [w_1 g_1(x, t), w_2 g_2(x, t), \ldots, w_n g_n(x, t)]^T \quad \text{Equation 9}$$

$$g_i(x, t) = \sum_j w_{xj} x_j - s_i(t) \quad \text{Equation 10}$$

where s(t) indicates a time-varying goal target. The weight $w_i$ is used to scale the importance of goal constraint $g_i$ relative to other goals. Each goal constraint $g_i$ affects a subset of the object's vertices, as indicated by the weights $w_{xj}$. For example, for the center-of-mass constraints described herein, the vertex weights $w_{xj}$ could be determined by $m_j/\Sigma_i m_i$. The weights $w_{xj}$ for vertices not affected by a specific goal could be set to zero.

In some cases, constraints are conveniently represented as a function of velocity rather than positions. For example, for a deformable object to exhibit a hopping motion, the motion controller 240 could generate a desired vertical velocity for the center of mass of the deformable object. Goal targets may be expressed as a function of velocity as given by Equation 11 below:

$$\hat{g}_i(x, t) = k_p\left(\sum_j w_{xj}x_j - s_{xi}(t)\right) + k_d\left(\sum_j w_{xj}v_j - s_{vi}(t)\right) \quad \text{Equation 11}$$

where $k_p$, $k_d$, $s_{xi}(t)$, and $s_{vi}(t)$ are provided by the motion controller 240. By expressing the velocity v of each vertex as a function of the vertex positions at the previous time step $x_n$, $v=(x-x_n)/h$, the goal target $s_i(t)$ from equation 10 may be expressed as shown in Equation 12 below:

$$s_i(t) = \frac{h}{hk_p + k_d}\left(k_p s_{xi} + k_d s_{vi} + \frac{k_d}{h}\sum_j w_{xj}x_{nj}\right) \quad \text{Equation 12}$$

and the goal weight with $w_i(t)$ from Equation 9 may be expressed as shown in Equation 13 below:

$$w_i(t) = \frac{hk_p + k_d}{h} \quad \text{Equation 13}$$

Solving the optimization problem of Equation 8 is equivalent to simultaneously solving for the internal control forces that minimize the objective g and integrating the system state forward in time. As a result, the effective planning horizon of the disclosed techniques is equal to the simulation time step. This simple control strategy is both effective and intuitive. Various motions, such as hopping and rolling motions, may be created for deformable objects of differing shapes and sizes. More complicated behaviors, such as bipedal walking, may likely be successfully controlled. For these latter, more complex, motions, the motion controller may implement control strategies to generate multiple high-level motion features, such as targets for the positions of the center of mass and for positions for each foot associated with the deformable object.

The solver 250 receives an elastic potential W(X,x) from the dynamic model 210, a rest state configuration X(p) from the rest state parameterization module 220, a regularizing potential r(p) from the regularizer 230, and an objective function g(x,t) from the controller 240. From these received inputs, the solver 250 resolves the optimization problem to derive the deformed rest state configuration x and the displacements p of the set of controllable mesh vertices for the next time step of the animation. The solver 250 then sets the undeformed rest state configuration X to the deformed rest state configuration x, and resolves the optimization problem for the subsequent time step. The solver 250 proceeds to resolve each subsequent time step until the animation sequence completes.

The solver 250 includes a Lagrangian optimization module 255 that numerically resolves the optimization function of Equation 8, thus computing the motion for the controlled deformable objects. The computed motion may be non-linear with respect to both the objective function and constraints. Accordingly, a sequentially quadratic programming (SQP) approach may be used to resolve the optimization function of Equation 8 at each time step of the animation. This SQP approach begins by defining a Lagrangian function associated with the optimization problem, as shown in Equation x below:

$$L(x, p, \lambda) = \frac{1}{2}|g(x, t)|^2 + r(p) + \lambda^T c(X(p), x) \quad \text{Equation 14}$$

Using a Newton-Raphson method, the Lagrangian optimization module 255 may iteratively resolve the three first-order optimality conditions, as set forth in Equations 15-17 below:

$$0 = \frac{\partial L}{\partial x} = g(x, t)\frac{\partial g}{\partial x} + \lambda^T\left(\frac{1}{h^2}M - \frac{\partial f_{tot}}{\partial x}(X(p), x)\right) \quad \text{Equation 15}$$

$$0 = \frac{\partial L}{\partial p} = \frac{\partial r}{\partial p}(p) - \lambda^T \frac{\partial f_{int}}{\partial X}(X(p), x)\frac{\partial X}{\partial p} \quad \text{Equation 16}$$

$$0 = \frac{\partial L}{\partial \lambda} = M\ddot{x} - f_{tot}(X(p), x) \quad \text{Equation 17}$$

where the total force $f_{tot}(X(p),x) = f_{int}(X(p),x) + f_{ext}(x)$, which includes forces internal to the deformable object $f_{int}$ and external forces $f_{ext}$ such as position-dependent contact forces. At each iteration, the Lagrangian optimization module 255 may compute correction functions $\Delta x$, $\Delta p$, $\Delta \lambda$ for each of equations 15-17 above by solving a linear system as shown in equation 18 below:

$$\begin{bmatrix} A & B^T & D^T \\ B & C & E^T \\ D & E & 0 \end{bmatrix} \begin{bmatrix} \Delta x \\ \Delta p \\ \Delta \lambda \end{bmatrix} = \begin{bmatrix} a \\ b \\ c \end{bmatrix} \quad \text{Equation 18}$$

where matrix blocks $A=\partial_{xx}L$, $B=\partial_{px}L$, $C=\partial_{pp}L$, $D=\partial_{\lambda x}L$, and $E=\partial_{\lambda p}L$ correspond to the partial Hessians of the Lagrangian function the vectors $a=\partial L/\partial x$, $b=\partial L/\partial p$, and $c=\partial L/\partial \lambda$ are the partial gradients of L. Having solved the function for the search direction, the Lagrangian optimization module 255 then determines an appropriate time step size using a linesearch method as presented in Equation 19 below:

$$\begin{bmatrix} x_{n+1} \\ p_{n+1} \\ \lambda_{n+1} \end{bmatrix} = \begin{bmatrix} x_n \\ p_n \\ \lambda_n \end{bmatrix} - \alpha \begin{bmatrix} \Delta x \\ \Delta p \\ \Delta \lambda \end{bmatrix} \quad \text{Equation 19}$$

where $\alpha$ is the time step. The time step is initially set to $\alpha=1.0$. The time step is successively halved so long as the new time step results in an increased value of the merit function $\psi(x,p)$ as set forth in Equation 20 below:

$$\psi(x, p) = \frac{1}{2}|g(x, t)|^2 + r(p) + \gamma|c(X, x)|_{L^1} \quad \text{Equation 20}$$

The Lagrangian optimization module 255 may adjust the parameter $\gamma$ to adaptively control the importance of constraint satisfaction. The Lagrangian optimization module 255 initially sets $\gamma$ to a relatively small value of to allow for larger time steps in the beginning of iterative optimization and may then progressively increase the value of $\gamma$ in order to obtain accurate constraint satisfaction upon convergence of the optimization function.

The linear system presented in Equation 18 is symmetric and indefinite with a specific block structure where B, C, and E are dense whereas A is sparse. Although efficient direct solvers exist for symmetric indefinite problems, the dense blocks B, C, and E significantly reduce the performance of such factorization methods. However, the linear system of Equation 18 may be efficiently solved with a factorization approach using Gaussian block elimination. Such an approach may leverage the fact that $D=1/h^2 \, M - \partial f_{tot}/\partial x$ is invertible. Rearranging the linear equations from Equation 18 yields the relationships expressed in Equations 21-23 shown below:

$$\Delta x = D^{-1}(c - E\Delta p).\qquad\text{Equation 21}$$

$$(B^T - AF)\Delta p + D^T \Delta\lambda = a - Ad \qquad\text{Equation 22}$$

$$(C - BF)\Delta p + E^T \Delta\lambda = b - Bd \qquad\text{Equation 23}$$

where $F = D^{-1}E$ and $d = D^{-1}c$. Solving Equation 22 for $\Delta\lambda$ and substituting the resulting expression into Equation 23 yields a linear system for $\Delta p$ as presented in Equation 24 below:

$$K\Delta p = b - Bd - F^T a + F^T Ad \qquad\text{Equation 24}$$

where $K = (C - BF - F^T B^T + F^T AF)$. Having pre-computed F and d, as described above, $\Delta p$ may be resolved numerically and then used to successively compute the remaining two correction functions $\Delta\lambda$ and $\Delta x$ as given by Equations 25 and 26 below:

$$D^T \Delta\lambda = a - Ad + (AF - B^T)\Delta p \qquad\text{Equation 25}$$

$$\Delta x = d - F\Delta p \qquad\text{Equation 26}$$

The block-based formulation described above may be efficiently implemented using a sparse factorization solver. After first prefactoring matrix D, a symmetric matrix, F and d may be computed using back substitution. Equation 16 may then be solved in a similar manner. Although the linear system expressed in Equation 15 is dense, the size of the linear dim(p) is relatively small. As a result, the computational costs to solve the system are relatively small compared to the costs for solving sparse matrix D.

As further described herein, the solver 250 may be configured to perform rest state adaptation of a deformable object using an unrestricted, cage-based, or example-based approach. In one embodiment, the vertices of the geometric mesh associated with a deformable object may be altered in an unrestricted manner, whereby each vertex of the geometric mesh may be independently controlled. In another embodiment, coarse-scale deformations may be applied to the vertices of a polygonal "cage" that encloses the deformable object, rather than directly altering vertices internal to the object. In yet another embodiment, motion of the deformable object may be constrained by one or more "example" poses that define potential shapes that the deformable object may approximate during animation. These three embodiments are further described below.

Figure 3:
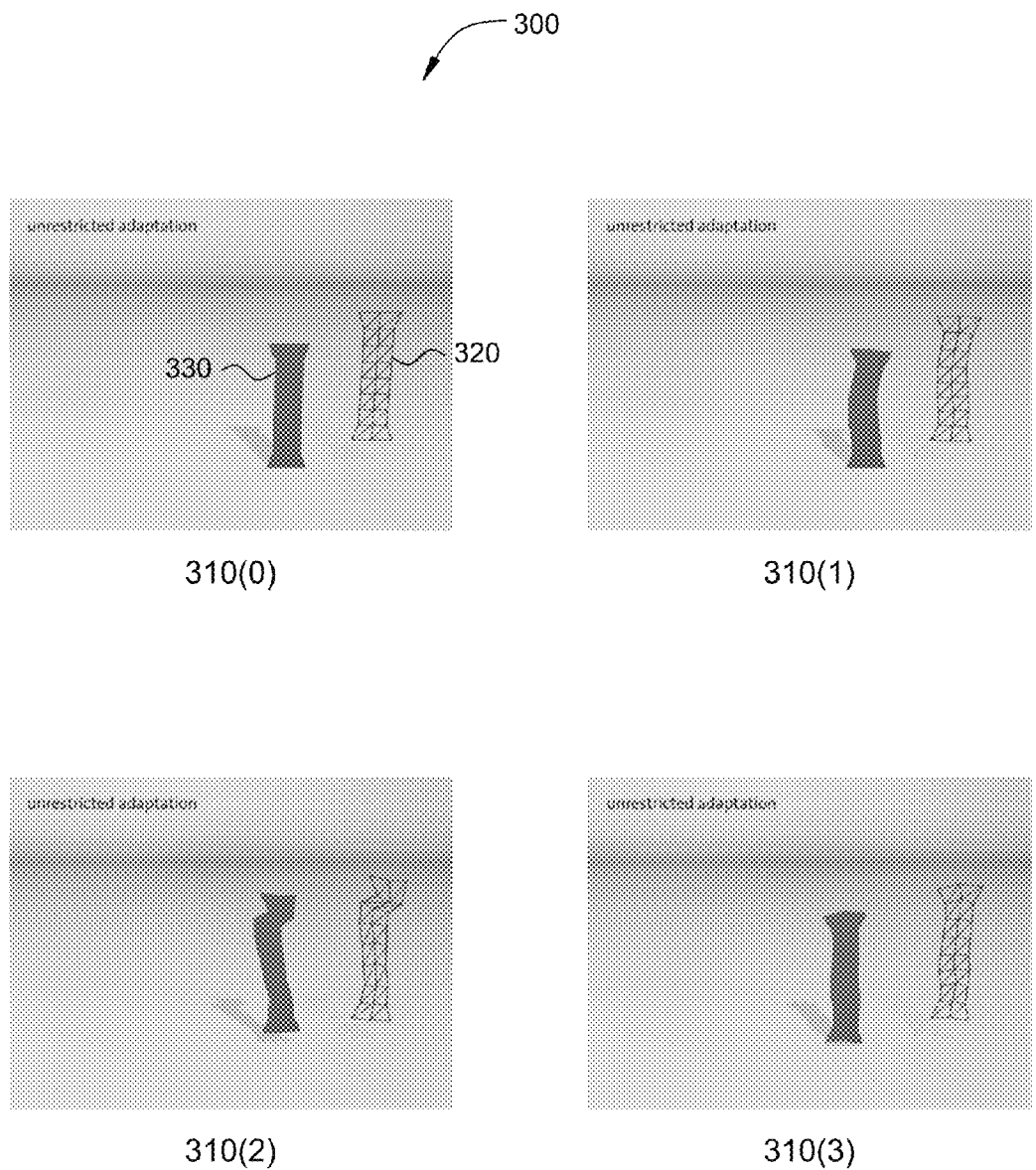
FIG. 3 illustrates deformable objects animated with an unrestricted rest state adaptation approach, according to one embodiment of the invention.

FIG. 3 illustrates deformable objects animated with an unrestricted rest state adaptation approach, according to one embodiment of the invention. As shown, a deformable object 330 is associated with a geometric mesh that defines a rest state configuration 320. During animation, the rest state configuration 320 is deformed, resulting in a corresponding deformation of the deformable object 330. A sequence of rendered images 310 illustrates the rest state configuration 320 and the deformable object 330 during an animation sequence where the deformable object 330 is directed to hop to the left. The rendered images 310 illustrate the rest state configuration 320 and the deformable object 330 in an initial condition prior to the hop 310(0), in a compressed position to prepare for the hop 310(1), in the midst of the hop 310(2), and landing at the end of the hop 310(3). As further described herein, the unrestricted rest state adaptation approach may result in a greater range of motion for the deformable object 330. However, the resulting animation may be more complex to resolve, leading to increased computational demand.

With the unrestricted adaptation approach, each vertex of the rest state configuration 320 for the deformable object 330 is separately controllable. As such, each vertex of the rest state configuration 320 is a control parameter in the optimization problem shown in Equation 8. For the unrestricted approach, the linear map L from Equation 7 is an identity matrix of appropriate dimensions. Although the unrestricted adaptation approach may reveal plausible motion paths, this approach may result in a relatively large optimization problem, which may be more difficult and computationally expensive to solve. The unrestricted adaptation approach may also lead to large, non-smooth changes of the rest state configuration 320.

The regularizer 230 may generate a regularizing potential r(p) to smooth these large changes in the rest state configuration 320, thereby counteracting undesirable distortions in the deformable object. If two solutions are similar in terms of the optimization problem of Equation 8, the regularizer 230 selects the solution that is closer to the initial rest shape $X_0$. The regularizer 230 may generate a regularizing potential r(p) based on the elastic potential between the current and initial rest poses, as shown in Equation 27 below:

$$r(p) = W_{reg}(X_0, X(p)) \qquad\text{Equation 27}$$

where the regularizing potential r(p) or $W_{reg}$ to be of the same form as the internal deformation energy W but allow for different material parameters. The regularizer 230 may scale various factors differently, such as by penalizing changes in volume of the deformable object more severely than other deformations.

Figure 4:
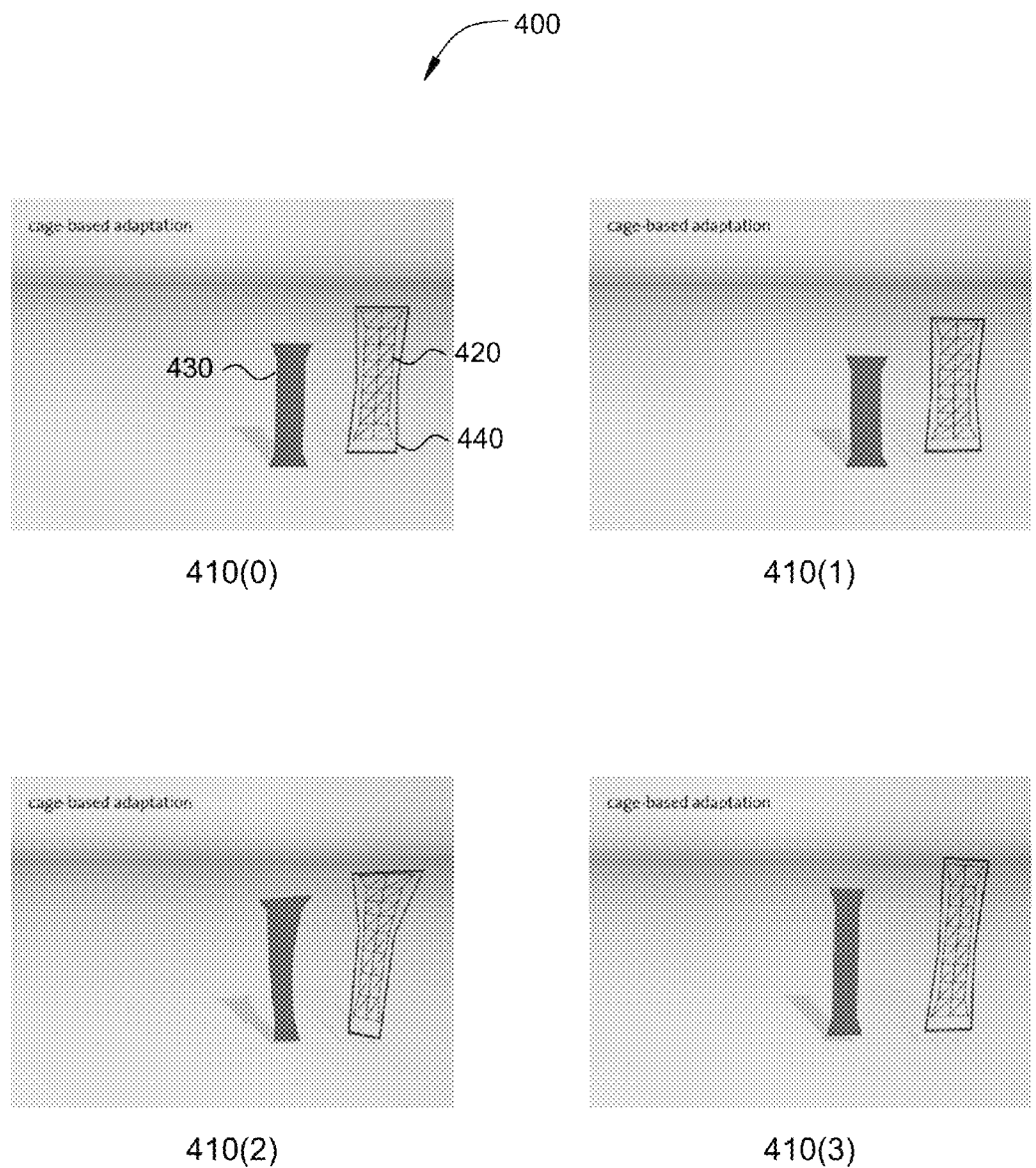
FIG. 4 illustrates deformable objects animated with a cage-based rest state adaptation approach, according to one embodiment of the invention.

FIG. 4 illustrates deformable objects animated with a cage-based rest state adaptation approach, according to one embodiment of the invention. As shown, a deformable object 430 is associated with a geometric mesh that defines a rest state configuration 420. The rest state configuration 420 and the deformable object 430 function substantially as described in conjunction with FIG. 3, except as further described below. The deformable object 430 is also associated with a polygonal cage 440 that envelops the rest state configuration 420 and, correspondingly, the deformable object 430. During animation, the rest state configuration 420 is not directly deformed. Rather, the polygonal cage 440 is deformed, resulting in a corresponding deformation of the deformable object 430. A sequence of rendered images 410 illustrates the rest state configuration 420 and the deformable object 430 during an animation sequence where the deformable object 430 is directed to hop to the left. The rendered images 410 illustrate the rest state configuration 420 and the deformable object 430 in an initial condition prior to the hop 410(0), in a compressed position to prepare for the hop 410(1), in the midst of the hop 410(2), and landing at the end of the hop 410(3). As further described herein, the cage-based rest state adaptation approach may result in a deformation of the rest state configuration 430 that is smoother than the deformation resulting from unrestricted rest shape adaptation. As a result, the appearance of the deformable object may be smoother and exhibit a different style of motion than with the unrestricted approach.

Purposeful, visually-pleasing motion of the deformable object 430 may be created by controlling a subset of the vertices of the rest state configuration 420 for the deformable object 430, referred to herein as a coarse-scale deformation. For example, the center of mass of a deformable object 430 could be directed to follow a given trajectory without controlling all vertices of the rest state configuration 420. Coarse-scale deformations of a high-resolution rest state configuration 420 may be achieved by deforming the vertices of a polygonal cage 440 using harmonic coordinates. The deformation field defined by the polygonal cage 440 encloses the deformable object 430, rather than directly controlling the vertices of the rest state configuration 420. Such a polygonal cage 440 may be composed of polygons that surround the deformable object 430, where the vertices of the cage polygons are external to the deformable object 430. The deformation field is linear with respect to the cage vertices. Further, the deformation field is smooth in that the resulting rest state configuration 420 exhibits no isolated distortions or intersections. For cage vertices $C_j \in \mathbb{R}^3$ and associated harmonic coordinate function $h_j$, the deformed position of a given rest state vertex $X_{d,i} \in \mathbb{R}^3$ may be defined as shown in Equation 28 below:

$$X_{d,i} = X_{0,i} + \sum_j h_j(X_{0,i})C_j = X_{0,i} + \sum_j h_{ij}v_j \qquad \text{Equation 28}$$

The harmonic coordinates $h_{ij}$ are directly identified with the entries of the linear map L of Equation 7 as $L_{ij}=h_{ij}$, where the control parameters p Equation 7 are the cage vertices $C_j$. The coordinates are computed numerically. However, the coordinates are defined over the initial rest state $X_0$. As a result, the coordinates need only be computed once.

The cage-based approach restricts rest shape adaptations to lower frequency deformations. As a result, the search space for optimal solutions may be significantly reduced. As a result, the optimization problem may be solved with reduced computational demands. In an alternative approach, deformation of the rest shape may be directly controlled by defining example-based deformation subspaces, as further described below.

Figure 5:
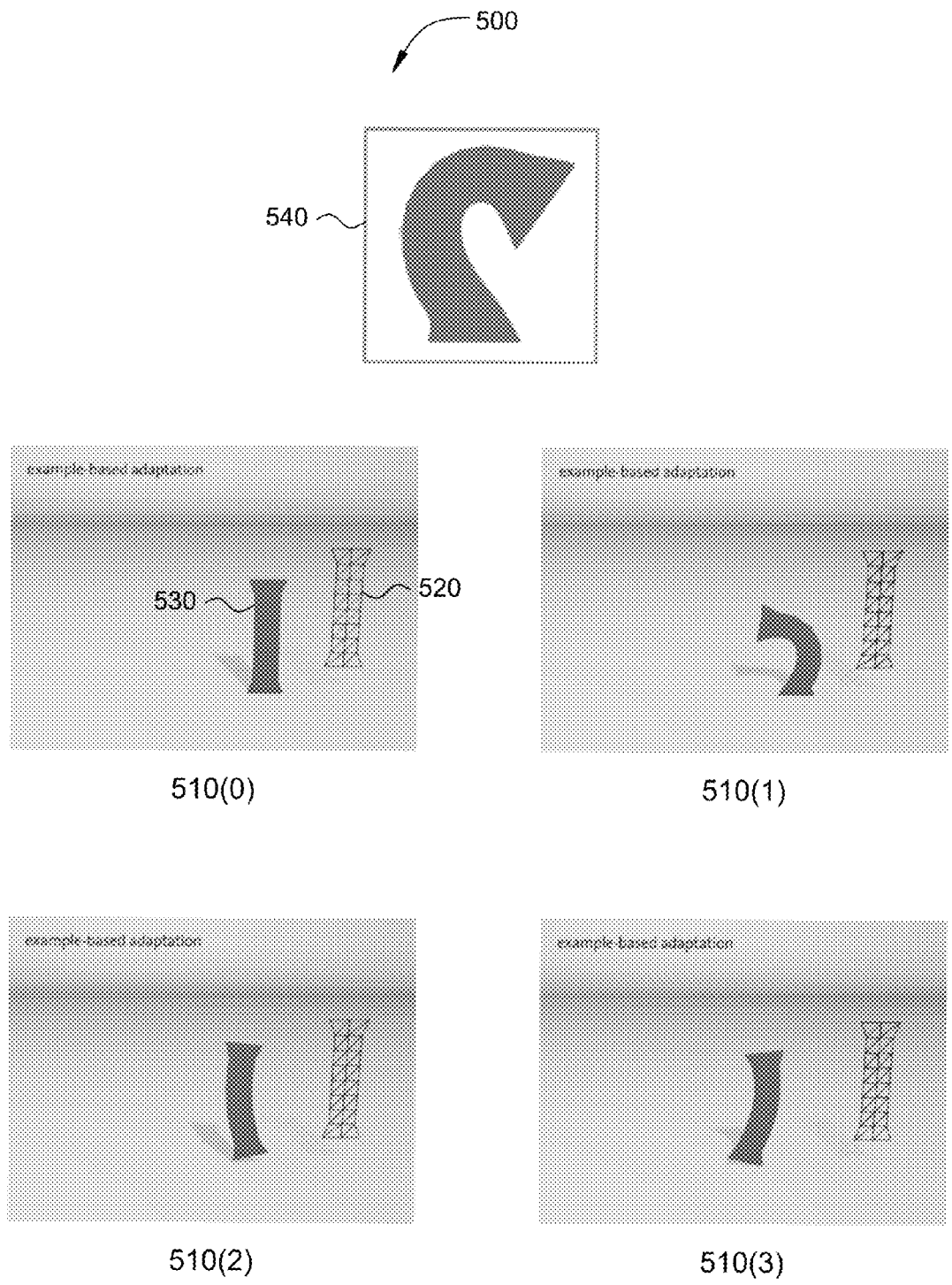
FIG. 5 illustrates deformable objects animated with an example-based rest state adaptation approach, according to one embodiment of the invention.

FIG. 5 illustrates deformable objects animated with an example-based rest state adaptation approach, according to one embodiment of the invention. As shown, a deformable object 530 is associated with a geometric mesh that defines a rest state configuration 520. The rest state configuration 520 and the deformable object 530 function substantially as described in conjunction with FIGS. 3-4, except as further described below. The deformable object 530 is also associated with an example pose 540 that defines a subspace that confines the shape of the rest state configuration 520 and, correspondingly, the deformable object 530. With example-based rest state adaptation, a user, such as an animator creates one or more example poses to define a subspace for rest shape adaptation. Accordingly, the example-based approach provides the user with explicit control over the style of the resulting motions.

The example space is defined by the initial undeformed pose of the deformable object 530 and the example pose 540. The motion of the deformable object is significantly influenced by the example pose 540 as the deformable object prepares for and performs the hop to the left. The different example poses lead to substantially different yet plausible jumping styles that respect the artistic intent. A sequence of rendered images 510 illustrates the rest state configuration 520 and the deformable object 530 during an animation sequence where the deformable object 530 is directed to hop to the left. The rendered images 510 illustrate the rest state configuration 520 and the deformable object 530 in an initial condition prior to the hop 510(0), in a compressed position to prepare for the hop 510(1), in the midst of the hop 510(2), and landing at the end of the hop 510(3).

As further described herein, example-based rest state adaptation may provide more artistic control over the deformation and motion of the deformable object 530 than with the cage-based approach while still limiting control to a subset of the vertices of the rest state configuration 520. With example-based rest state adaptation, a user selects one or more example poses that describes desirable object deformations. These example poses are converted into a representation suitable for interpolation. Convex combinations of the example poses are then used as the subspace for rest shape adaptations.

Multiple example poses 540 may be interpolated and combined via any technically feasible approach. For example, the example poses could be converted into an intermediate representation, including, without limitation, Laplacian coordinates, deformation gradients, or Green strains. An interpolated data set is then computed as a weighted, convex combination of one or more of the example poses 540. An interpolated rest state configuration 520 is then reconstructed by solving a system of nonlinear equations. Because the relationship between the input example poses 540 and the interpolated rest state configurations 520 may be implicit and nonlinear, the computation of rest state derivatives for solving Equation 8 may be quite complex. Accordingly, the reconstruction step described above may be avoided, such that the interpolated data sets may be used directly, as further described below.

This approach relies on two simplifying assumptions: (1) discrete elastic energies are typically computed by summing up elemental contributions; and (2) such elemental contributions are typically based on rotation-invariant deformation measures, such as the Green strain. As a result, the rest state configuration 520 of a given deformed object 530 may be subdivided into disjoint elements, and a random rotation may be applied to each of the elements without changing the elastic energy or the associated derivatives.

Accordingly, the rest state configuration 520 is modeled as an assembly of disjoint elements, or incompatible shapes, that are then interpolated. Shape interpolation is then achieved by interpolating each disjoint element and then combining the elements, rather than interpolating the combined shape directly. Each of the disjoint elements, in the various example poses, is first registered to a common reference frame by factoring out the rotations of the individual poses. Interpolation between different element poses is then accomplished by interpolating vertex positions associated with the elements in the various poses. With this interpolation scheme for example-based rest shape adaptations, energies and associated rest state derivatives are efficiently computed.

Referring to Equation 7 for computing the rest state configuration $X(p)$, if $X_0^e$ denotes vector of concatenated vertex positions $X_{0,i}^e \in \mathbb{R}^3$, $i=\{1, \ldots, 4\}$ for a given undeformed tetrahedral element e, then the example poses for element e may be encoded as corresponding vectors $X_k^e$. The deformation gradient $F_k^e = S_k S_0^{-1}$ is then computed between the undeformed element and each example pose, where $S_k, S_0 \in \mathbb{R}^{3 \times 3}$ are matrices with columns $S_{k,j}=X_{k,j}-X_{k,4}$ with $j=\{1,2,3\}$, holding the edge vectors for the elements. A polar decomposition $F_k^e$ is then applied to obtain the rotation $R_k^e$ that aligns example pose k with the reference frame as $\tilde{X}_{k,i}^e = (R_k^e)^T X_{k,i}^e$. The concatenations of these elemental vectors then define an interpolated rest shape as given by Equation 29 below:

$$X(p) = X_0 + \sum_k (\hat{X}_k - X_0) p_k \qquad \text{Equation 29}$$

Example-based adaptation via incompatible rest state interpolation may be efficiently performed in that the non-rotated positions $\hat{X}_j^e$ remain constant over time and, therefore, may be precomputed. Equation 29 may be cast into the form of Equation 7 by selecting the entries of the linear operator as $L_{ij} = (\hat{X}_j - X_0)_i$. The dimension of $X(p)$ is higher, as compared to unrestricted and cage-based adaptation, because vertices are no longer shared among the elements. Computation times are, however, largely governed by the size of the control parameter set p, which is determined by the number of example poses. Since the quantity of the control parameters under example-based adaptation is typically much smaller than the quantity of control parameters for unrestricted or cage-based adaptation, the example-based approach is more efficiently computed.

Although example-based interpolation behaves robustly for moderate extrapolation, the behavior of the deformable object may be non-intuitive under certain conditions. The regularizer 230 may apply a regularizing potential to cause the rest shape configuration to remain within the convex hull of the example poses. For cases where global example poses extend over the entire domain of the deformable object, the regularizer 230 may achieve such a result by generating a regularizing term r(p) as shown in Equation 30 below:

$$r(p) = \frac{1}{2} \left( \sum_i p_i - 1 \right)^2 \qquad \text{Equation 30}$$

In some embodiments, the regularizer 230 may generate a regularizing term r(p) that effectively "penalizes" negative values for the control parameters.

In some embodiments, example poses are defined that only affect localized regions of a deformable object. For example, an example pose could be specified that controls the range of possible deformations of the individual legs of a deformable object. In such cases, convexity constraints would be generated on only the subsets of the control parameters corresponding to the localized regions, such as the individual legs of the object.

In some embodiments, the interpolation for 3D solids, as given by Equation 29, may be applied to 2D and 3D finite elements. In the case of deformable surfaces, the bending deformation may also be computed. The difference between a discrete undeformed triangle mesh and the deformed counterpart is measured in terms of differences in edge lengths and dihedral angles of the mesh triangles. The edge lengths and dihedral angles may be linearly interpolated in such a length-angle strain space, resulting in intuitive motion behavior of the corresponding deformable surface.

Analogously to the techniques described for example-based rest state adaptation of 3D solids, incompatible rest state configurations may be defined by representing a shell surface with $n_e$ edges as a set of $n_e$ disjoint hinge element, each hinge element consisting of two edge-adjacent triangles.

The various example poses of each hinge element are registered to a common reference frame by applying affine transformations that align the center edge of each hinge element with the corresponding hinge element in the reference frame. The vertex positions between hinge elements may be linearly interpolated. Then, edge lengths and angles may be extracted from the interpolated geometry. For stretch deformation, such a technique is equivalent to interpolating edge lengths between the disjoint hinge elements. For bending deformation, this approach leads to a different interpolation speed compared to angle interpolation but is otherwise equivalent. As for the case of 3D solids, example based adaptation of surfaces, via incompatible shape interpolation, advantageously computes the deformed rest state reconfiguration element-by-element, rather than computing a non-linear reconstruction of a composite surface. These techniques, as described above for surfaces, may also be applied to deformable curves as well in analogous fashion.

Figure 6:
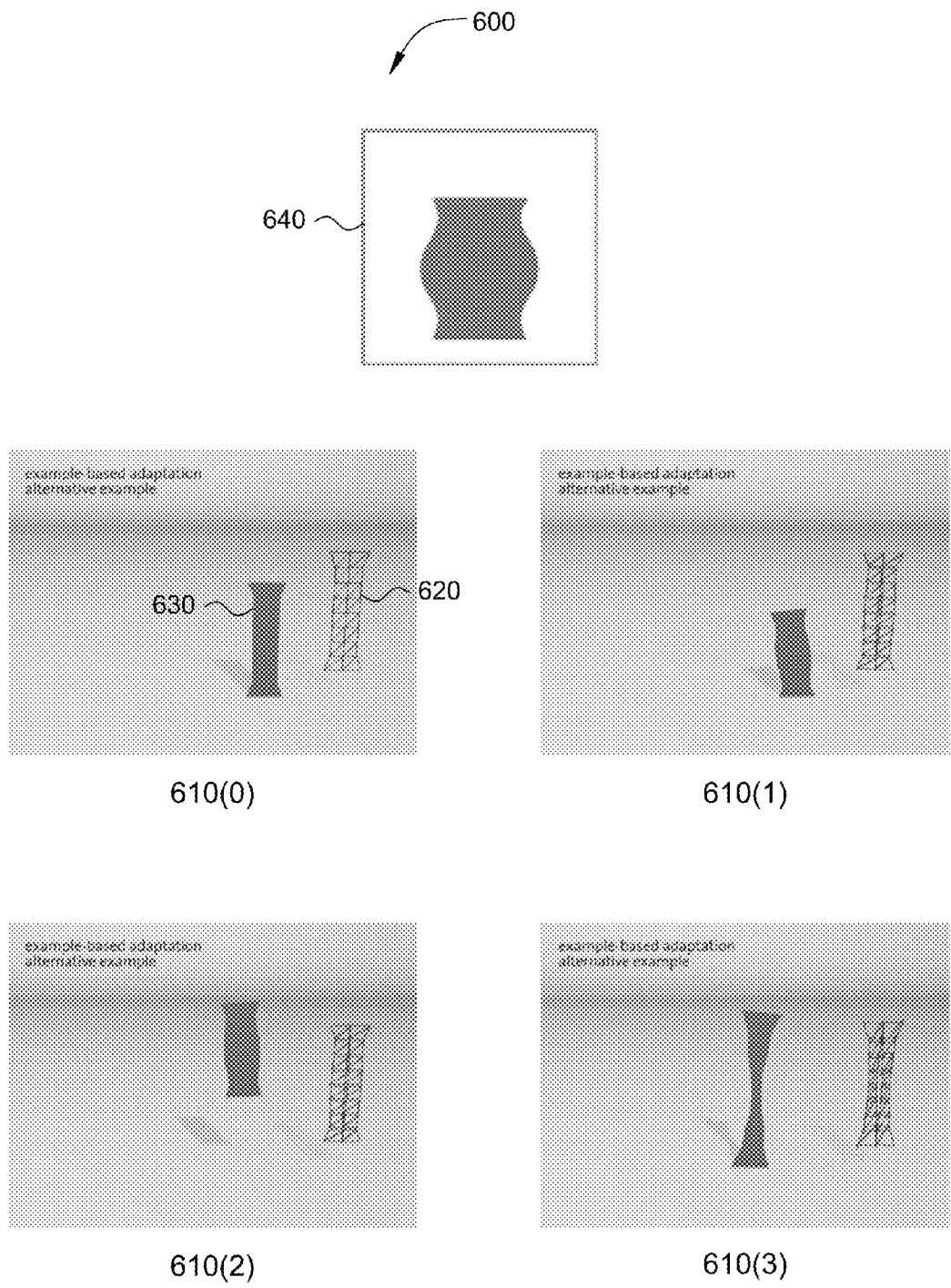
FIG. 6 illustrates deformable objects animated with an example-based rest state adaptation approach, according to another embodiment of the invention.

FIG. 6 illustrates deformable objects animated with an example-based rest state adaptation approach, according to another embodiment of the invention. As shown, a deformable object 630 is associated with a geometric mesh that defines a rest state configuration 620. The rest state configuration 620 and the deformable object 630 function substantially as described in conjunction with FIGS. 3-5, except as further described below. Here, the deformable object 630 is associated with a different example pose 640 that defines a subspace that confines the shape of the rest state configuration 620 and, correspondingly, the deformable object 630. Whereas example pose 540 directs the deformable object 530 to approximate a curved shape, example pose 640 directs the deformable object 630 to approximate a compressed shape.

A sequence of rendered images 610 illustrates the rest state configuration 620 and the deformable object 630 during an animation sequence where the deformable object 630 is directed to hop to the left. The rendered images 610 illustrate the rest state configuration 620 and the deformable object 630 in an initial condition prior to the hop 610(0), in a compressed position to prepare for the hop 610(1), in the midst of the hop 610(2), and landing at the end of the hop 610(3). In an embodiment, the deformable object 530 may be directed to approximate a shape that is a weighted, convex combination of example pose 540 and example pose 640.

Figure 7:
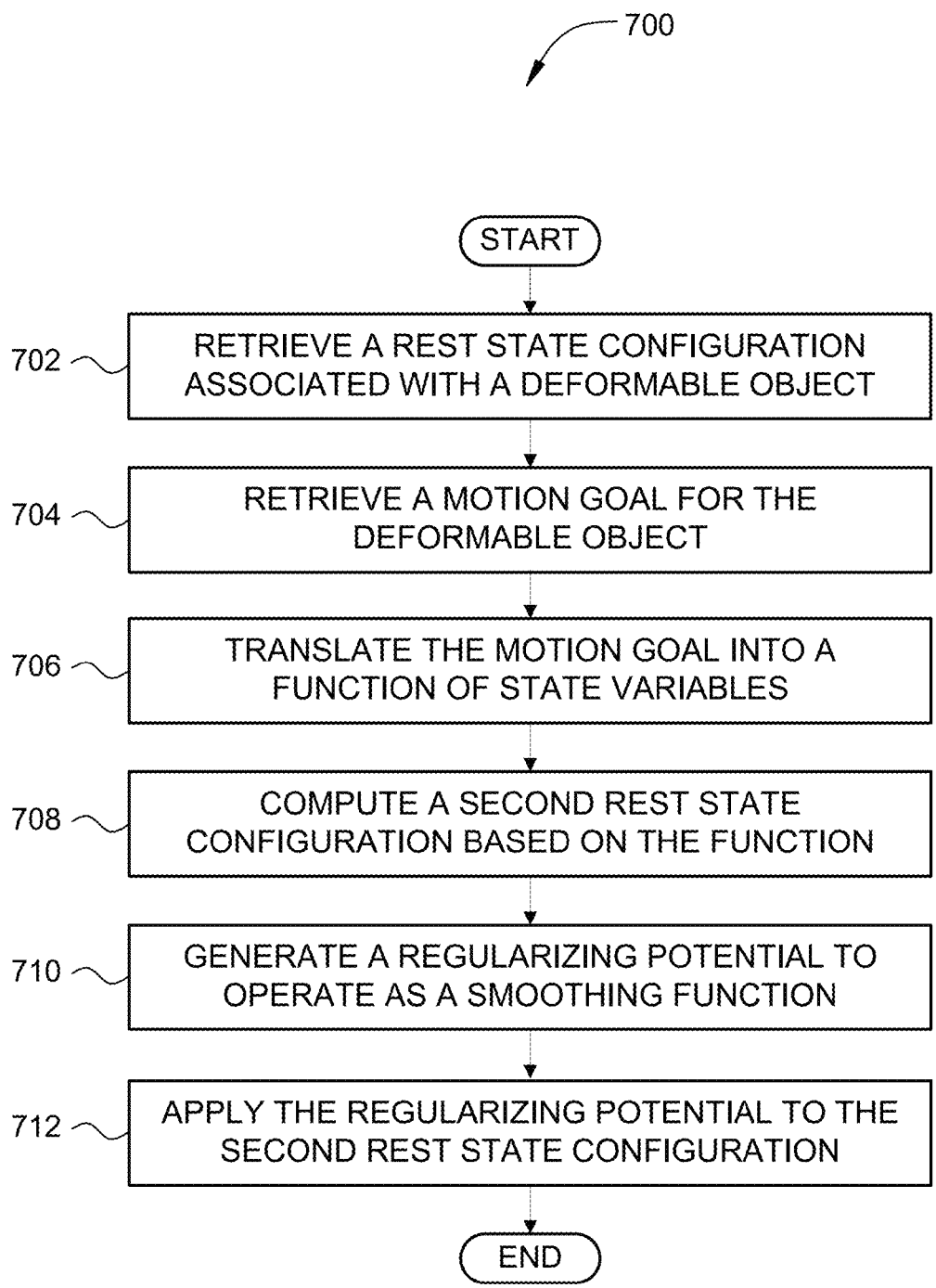
FIG. 7 sets forth a flow diagram of method steps for animating a deformable object via rest state adaptation, according to one embodiment of the invention.

FIG. 7 sets forth a flow diagram of method steps for animating a deformable object via rest state adaptation, according to one embodiment of the invention. Although the method steps are described in conjunction with the systems of FIGS. 1-2, persons skilled in the art will understand that any system configured to perform the method steps, in any order, falls within the scope of the present invention.

A method 700 begins at step 702, where the deformable object animation system 200 retrieves a geometric mesh that includes a plurality of vertices defining a first rest state configuration corresponding to the deformable object. At step 704, the deformable object animation system 200 retrieves a motion goal associated with the deformable object. At step 706, the deformable object animation system 200 translates the motion goal into a function of one or more state variables associated with the deformable object. At step 708, the deformable object animation system 200 computes a second rest state configuration corresponding to the deformable object by adjusting the position of a least one vertex in the geometric mesh, where the second rest state configuration is based on the function.

At step 710, the deformable object animation system 200 generates a regularizing potential that operates as a smoothing function associated for the second rest state configuration. At step 712, the deformable object animation system 200 applies the regularizing potential to the second rest state configuration to create a third rest state configuration corresponding to the deformable object. The method 700 then terminates.

It will be appreciated that the system shown herein is illustrative and that variations and modifications are possible. For example, the approaches disclosed herein are described in the context of certain elastic models associated with deformable objects and with a specific motion controller. However, these approaches could be implemented using any technically feasible elastic models and locomotion controllers.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In sum, motion of active deformable objects is controlled via deformations internal to the object. Such control is achieved by dynamically adapting the rest shape of the objects in order to induce deformations that, together with environment interactions, result in purposeful and physically-plausible motions. The rest state of deformable objects is adapted by altering the position of one or more vertices on a geometric mesh associated with the object. This geometric mesh may be created by subdividing the deformable object into a plurality of smaller geometric shapes of appropriate dimension. In one example, a deformable object in the shape of a curve could be subdivided into a series of end-connected line segments. In another example, a deformable object in the shape of a sheet or shell could be subdivided into a series of connected polygonal shapes, such as triangles. In yet another example, a deformable object in the shape of a 3D object could be subdivided into a series of connected geometric solids, such as tetrahedra.

While the foregoing is directed to embodiments of the present invention, other and further embodiments of the invention may be devised without departing from the basic scope thereof, and the scope thereof is determined by the claims that follow.

What is claimed is:

1. A method of animating a deformable object, the method comprising:
    retrieving a geometric mesh comprising a plurality of vertices related to a first rest state configuration corresponding to the deformable object;
    retrieving a motion goal associated with the deformable object;
    translating the motion goal into a function of one or more state variables associated with the deformable object;
    computing a second rest state configuration corresponding to the deformable object by adjusting the position of at least one vertex in the plurality of vertices based at least in part on the function; and
    rendering one or more image frames depicting the deformable object in at least one of the first and the second rest state configurations,
    wherein rest state configurations of the deformable object are parameterized such that the rest state configurations of the deformable object are generated based on an initial rest state configuration of the deformable object, displacements of a reduced set of controllable mesh vertices, and a linear map between changes in rest state coordinates and the displacements of the reduced set of controllable mesh vertices.

2. The method of claim 1, further comprising:
    generating a regularizing potential comprising a smoothing function associated with the second rest state configuration; and
    applying the regularizing potential to the second rest state configuration to create a third rest state configuration corresponding to the deformable object.

3. The method of claim 1, further comprising deforming the geometric mesh based on the second rest state configuration.

4. The method of claim 1, wherein the at least one vertex is internal to the deformable object.

5. The method of claim 1, wherein the geometric mesh encloses the deformable object such that each vertex in the plurality of vertices is external to the deformable object.

6. The method of claim 1, wherein the position of the at least one vertex is adjusted further based on a first example pose corresponding to the deformable object.

7. The method of claim 6, wherein the position of the at least one vertex is adjusted further based on a second example pose corresponding to the deformable object, wherein the first rest state configuration comprises a plurality of elements, and the method further comprises:
    computing a reference frame based on a weighted average of the first example pose and the second example pose; and
    registering each element in the plurality of elements to the reference frame.

8. The method of claim 6, further comprising converting the first example pose into at least one of Laplacian coordinates, deformation gradients, or Green strains.

9. The method of claim 1, wherein the motion goal defines a speed and direction corresponding to a center of gravity of the deformable object.

10. The method of claim 1, further comprising storing an animation file on a computer-readable medium, wherein the animation file comprises the output of the retrieving, translating, and computing steps.

11. A non-transitory computer-readable storage medium including instructions that, when executed by a processing unit, cause the processing unit to animate a deformable object, by performing steps comprising:
    retrieving a geometric mesh comprising a plurality of vertices related to a first rest state configuration corresponding to the deformable object;
    retrieving a motion goal associated with the deformable object;
    translating the motion goal into a function of one or more state variables associated with the deformable object;
    computing a second rest state configuration corresponding to the deformable object by adjusting the position of at least one vertex in the plurality of vertices based at least in part on the function; and rendering one or more image frames depicting the deformable object in at least one of the first and the second rest state configurations, wherein rest state configurations of the deformable object are parameterized such that the rest state configurations of the deformable object are generated based on an initial rest state configuration of the deformable object, displacements of a reduced set of controllable mesh vertices, and a linear map between changes in rest state coordinates and the displacements of the reduced set of controllable mesh vertices.

12. The computer-readable storage medium of claim 11, the steps further comprising:

generating a regularizing potential comprising a smoothing function associated with the second rest state configuration; and applying the regularizing potential to the second rest state configuration to create a third rest state configuration corresponding to the deformable object.

13. The computer-readable storage medium of claim 11, the steps further comprising deforming the geometric mesh based on the second rest state configuration.

14. The computer-readable storage medium of claim 11, wherein the at least one vertex is internal to the deformable object.

15. The computer-readable storage medium of claim 11, wherein the geometric mesh encloses the deformable object such that each vertex in the plurality of vertices is external to the deformable object.

16. The computer-readable storage medium of claim 11, wherein the position of the at least one vertex is adjusted further based on a first example pose corresponding to the deformable object.

17. The computer-readable storage medium of claim 16, wherein the position of the at least one vertex is adjusted further based on a second example pose corresponding to the deformable object, wherein the first rest state configuration comprises a plurality of elements, and the steps further comprise:

computing a reference frame based on a weighted average of the first example pose and the second example pose; and registering each element in the plurality of elements to the reference frame.

18. The computer-readable storage medium of claim 16, the steps further comprising converting the first example pose into at least one of Laplacian coordinates, deformation gradients, or Green strains.

19. The computer-readable storage medium of claim 11, wherein the motion goal defines a speed and direction corresponding to a center of gravity of the deformable object.

20. A computing system, comprising:

a memory that is configured to store instructions for a program; and a processor that is configured to execute the instructions for the program to animate a deformable object, by performing steps comprising:

retrieving a geometric mesh comprising a plurality of vertices related to a first rest state configuration corresponding to the deformable object, retrieving a motion goal associated with the deformable object, translating the motion goal into a function of one or more state variables associated with the deformable object, computing a second rest state configuration corresponding to the deformable object by adjusting the position of at least one vertex in the plurality of vertices based at least in part on the function, and rendering one or more image frames depicting the deformable object in at least one of the first and the second rest state configurations, wherein rest state configurations of the deformable object are parameterized such that the rest state configurations of the deformable object are generated based on an initial rest state configuration of the deformable object, displacements of a reduced set of controllable mesh vertices, and a linear map between changes in rest state coordinates and the displacements of the reduced set of controllable mesh vertices.

* * * * *